(12) United States Patent
Hatano et al.

(10) Patent No.: US 11,298,833 B2
(45) Date of Patent: Apr. 12, 2022

(54) GRIPPER, GRASPING DEVICE, AND INDUSTRIAL ROBOT

(71) Applicant: NITTA CORPORATION, Osaka (JP)

(72) Inventors: Itaru Hatano, Yamatokoriyama (JP); Shunsuke Iwata, Yamatokoriyama (JP); Hirokazu Nitta, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 64 days.

(21) Appl. No.: 16/765,439

(22) PCT Filed: Nov. 8, 2018

(86) PCT No.: PCT/JP2018/041512
§ 371 (c)(1),
(2) Date: May 19, 2020

(87) PCT Pub. No.: WO2019/102862
PCT Pub. Date: May 31, 2019

(65) Prior Publication Data
US 2020/0324420 A1 Oct. 15, 2020

(30) Foreign Application Priority Data
Nov. 27, 2017 (JP) .............................. JP2017-227234

(51) Int. Cl.
*B25J 15/12* (2006.01)
*B25J 15/00* (2006.01)
(Continued)

(52) U.S. Cl.
CPC ........... *B25J 15/12* (2013.01); *B25J 15/0023* (2013.01); *B25J 15/0625* (2013.01); *B25J 11/0045* (2013.01)

(58) Field of Classification Search
CPC .... B25J 15/12; B25J 15/0023; B25J 15/0625; B25J 15/08; B25J 15/0028; B25J 11/0045
See application file for complete search history.

(56) References Cited

U.S. PATENT DOCUMENTS 4,671,553 A * 6/1987 Bertini .................... B25B 5/061
    294/100
4,699,414 A * 10/1987 Jones ..................... B25J 15/026
    294/119.1
(Continued)

FOREIGN PATENT DOCUMENTS

DE           4240814 A1    6/1994
DE   102012001326 A1    7/2013
(Continued)

OTHER PUBLICATIONS

Office Action for the corresponding JP application No. 2020-174396 dated Jul. 6, 2021 and English translation thereof.
(Continued)

*Primary Examiner* — Stephen A Vu
(74) *Attorney, Agent, or Firm* — Muncy, Geissler, Olds & Lowe, P.C.

(57) ABSTRACT

There is provided a gripper, a gripping device, and an industrial robot that can more reliably grip a workpiece without using a granular material. The gripper includes integrally: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; and a high-strength portion provided between the palm portion and the connecting portion, the high-strength portion having a predetermined length from the outer edge of the palm portion in the thickness direction of the palm portion, and the high-strength portion being less likely to be deformed than the palm portion.

8 Claims, 10 Drawing Sheets

(51) Int. Cl.
    *B25J 15/06*         (2006.01)
    *B25J 11/00*         (2006.01)

(56) References Cited

U.S. PATENT DOCUMENTS

| | | | |
|---|---|---|---|
| 4,768,428 A * | 9/1988 | Silvestrini | A23N 4/04 |
| | | | 294/106 |
| 5,263,753 A | 11/1993 | Breu et al. | |
| 5,295,723 A | 3/1994 | Kronseder | |
| 5,458,388 A | 10/1995 | Danek | |
| 2004/0212206 A1 | 10/2004 | Chang et al. | |
| 2011/0098859 A1 | 4/2011 | Irie et al. | |
| 2012/0025553 A1 * | 2/2012 | Fischer | B25J 15/103 |
| | | | 294/198 |
| 2015/0360372 A1 * | 12/2015 | Schiettecatte | B25J 15/0023 |
| | | | 294/197 |

FOREIGN PATENT DOCUMENTS

| | | |
|---|---|---|
| DE | 102012100916 A1 | 8/2013 |
| JP | H05503666 A | 6/1993 |
| JP | 2009/279707 A | 12/2009 |
| JP | 2011115930 A | 6/2011 |
| JP | 2013240853 A | 12/2013 |
| JP | 2017185553 A | 10/2017 |

OTHER PUBLICATIONS

Supplementary European Search Report of the corresponding EP application No. EP18880934.7 dated Aug. 27, 2021.

* cited by examiner (A)

(B)

GRIPPER, GRASPING DEVICE, AND INDUSTRIAL ROBOT

TECHNICAL FIELD

The present invention relates to a gripper, a gripping device, and an industrial robot.

BACKGROUND ART

As a gripping device for gripping a workpiece, a gripping device is disclosed that includes a bag-shaped gripping body including a palm portion, a plurality of finger portions protruding from a periphery of the palm portion and configured to fall toward the palm portion by deforming the palm portion in a thickness direction, and a granular material held in the gripping body (Patent Literature 1). The gripping device reduces pressure in the gripping body to deform the palm portion in the thickness direction and elastically deform the finger portions to fall toward the palm portion. Since including the plurality of finger portions, the gripping device can versatilely grip workpieces of different sizes or shapes. The gripping device can grip a workpiece merely by reducing pressure in the gripping body and thus can be simply controlled. Also, there is no need to press the gripping body hard against a workpiece, and thus a soft workpiece such as food can be gripped without being damaged.

CITATION LIST

Patent Literature

Patent Literature 1: Japanese Patent Laid-Open No. 2017-185553

SUMMARY OF INVENTION

Technical Problem

However, if the gripping body of the gripping device in Patent Literature 1 bursts due to deterioration, breakage, or the like, the granular material filling the gripping body scatters and contaminates the workpiece. This is a problem. The granular material is deteriorated by density changes due to jamming transition, and cannot be stably used. This is a problem.

An object of the present invention is to provide a gripper, a gripping device, and an industrial robot that can more reliably grip a workpiece without using a granular material.

Solution to Problem

A gripper according to the present invention includes integrally: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; and a high-strength portion provided between the palm portion and the connecting portion, the high-strength portion having a predetermined length from the outer edge of the palm portion in the thickness direction of the palm portion, and the high-strength portion being less likely to be deformed than the palm portion.

A gripping device according to the present invention includes: the gripper, and the case connected to the connecting portion.

An industrial robot according to the present invention includes the gripping device.

Advantageous Effects of Invention

According to the present invention, the high-strength portion prevents contraction of an outer periphery of the palm portion, and thus the palm portion is deformed in the thickness direction to deform the finger portions toward the palm portion, thereby gripping a workpiece. Thus, the workpiece can be more reliably gripped without using a granular material. The high-strength portion is integrated with the palm portion and the finger portions, and thus the finger portions are continuously and gently deformed. Thus, the gripping device can softly grip the workpiece.

BRIEF DESCRIPTION OF DRAWINGS

Each of FIGS. 10A and 10B shows a gripper according to Modified example (3)

Each of FIGS. 11A and 11B shows a gripper according to Modified example (4)

DESCRIPTION OF EMBODIMENTS

Figure 1:
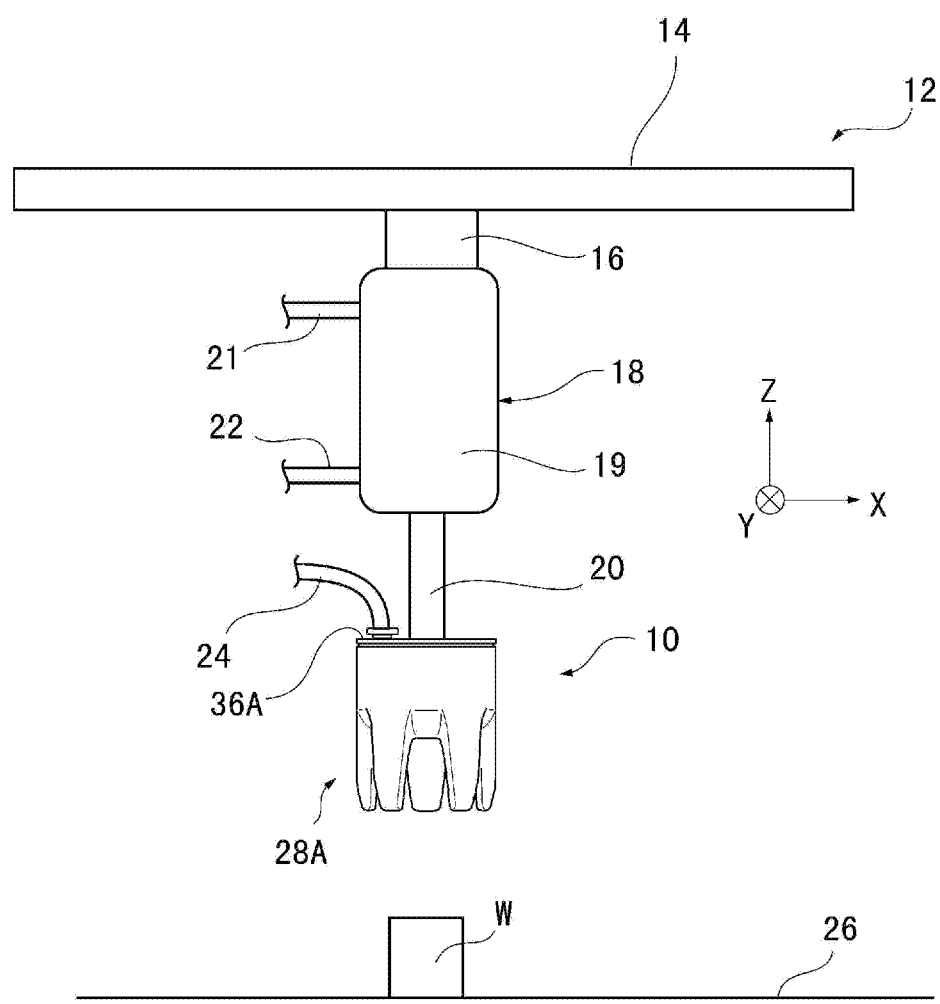
FIG. 1 is a schematic view of an example of an industrial robot to which a gripping device according to the embodiment is applied.

A gripper according to the present invention includes integrally: a palm portion; a plurality of finger portions protruding from a periphery of the palm portion and configured to fall toward the palm portion by deforming the palm portion in a thickness direction; a connecting portion formed in a position surrounding an outer edge of the palm portion on a side opposite to a side formed with the finger portions, the connecting portion connected to a case; and a high-strength portion provided between the palm portion and the connecting portion, the high-strength portion having a predetermined length from the outer edge of the palm portion in the thickness direction of the palm portion, and the high-strength portion being less likely to be deformed than the palm portion.

The high-strength portion is less likely to be deformed than the palm portion, and thus when pressure in the palm portion is reduced, the palm portion is deformed in the thickness direction without its outer periphery contracting. Thus, the finger portions of the gripper are elastically deformed to fall toward the palm portion, and thus the gripper can more reliably grip the workpiece without using a granular material.

The high-strength portion is a certain region between the connecting portion and the palm portion. The high-strength portion is formed to have higher mechanical strength than the palm portion. The high-strength portion may be uniformly or partially provided around the palm portion. Specifically, the high-strength portion may be thicker than the palm portion. In this case, the high-strength portion may be uniformly or partially thick. When being partially thick, the high-strength portion may be partially thick in a circumferential direction of the palm portion or in a direction parallel to the thickness direction of the palm portion. The high-strength portion may be made of a material having higher mechanical strength than a material of the palm portion. The material having high mechanical strength may include a material of the same nature as the material of the palm portion but having higher hardness, a material different from the material of the palm portion, a material containing an additive such as a filler, or a composite thereof.

A base end of the high-strength portion comes into contact with a part of the case. The base end of the high-strength portion may come into surface contact or line contact with the case. The base end preferably has a contact surface coming into contact with the case. When the case includes an upper case and a lower case, the upper case may come into contact with the contact surface or the lower case may come into contact with the contact surface.

The high-strength portion is a certain region from the base end to a distal end connected to the palm portion. The distal end is a boundary between the high-strength portion and the palm portion, but cannot be always clearly visually recognized. The distal end preferably serves as a fulcrum when the palm portion is deformed in the thickness direction.

Now, with reference to drawings, embodiments of the present invention will be described in detail.

(Overall Configuration)

FIG. 1 shows a configuration of an industrial robot 12 to which a gripping device 10 according to the embodiment is applied. The industrial robot 12 is an orthogonal robot and includes a rail 14, a moving body 16 that moves along the rail 14, and an air cylinder 18 secured to the moving body 16. The rail 14 is provided movably in a Y-axis direction in FIG. 1.

The air cylinder 18 includes a cylinder tube 19 and a piston rod 20 provided to be advanced from and retracted into the cylinder tube 19. The cylinder tube 19 includes pipes 21, 22. Air is supplied and exhausted through the pipes 21, 22 to allow the piston rod 20 to be advanced from and retracted into the cylinder tube 19. A gripping device 10 is provided at a distal end of the piston rod 20.

The industrial robot 12 can grip a workpiece W placed on a horizontal base 26 with the gripping device 10 and move the workpiece W in X-axis, Y-axis, and Z-axis directions.

The gripping device 10 includes a case 36A coupled to the piston rod 20 and a gripper 28A secured to the case 36A. A pipe 24 is coupled to the case 36A. The gripper 28A can be made of an airtight and elastic material, for example, natural rubber, synthetic rubber, or the like. Hardness of the gripper 28A measured according to JIS K6253: durometer hardness test (type A) is preferably about 60 to 90.

Figure 2:
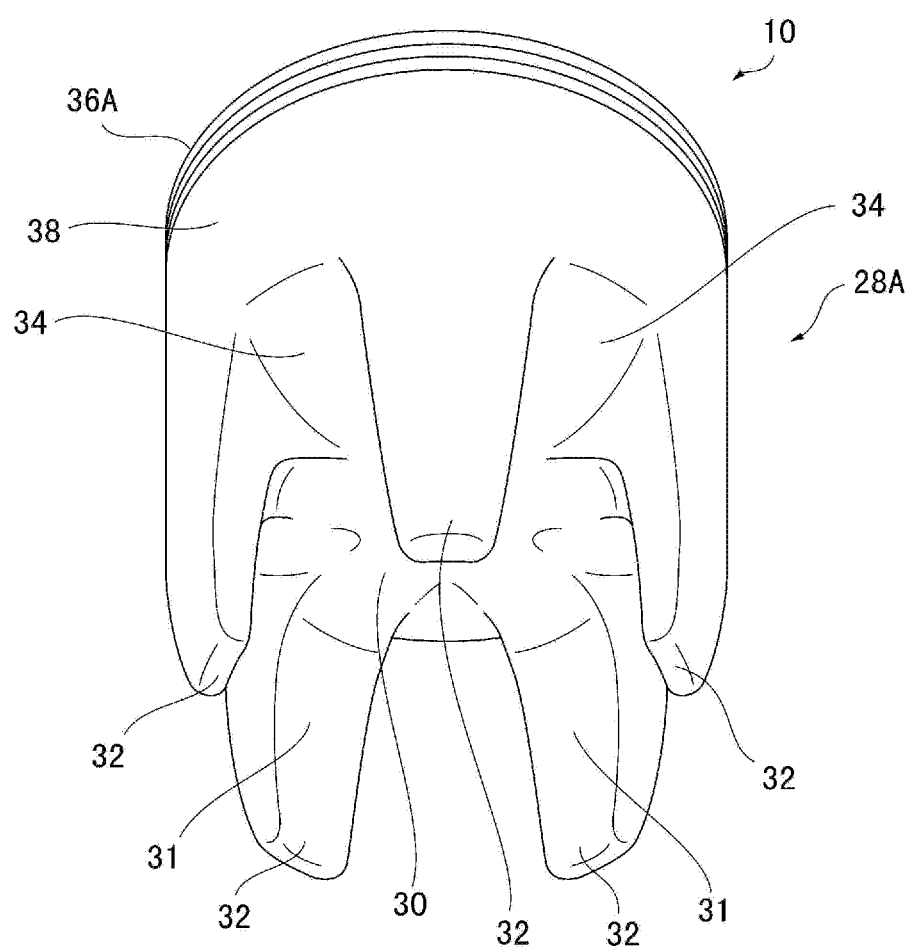
FIG. 2 is a perspective view of a configuration of the gripping device according to the embodiment.

As shown in FIG. 2, the gripper 28A includes a palm portion 30 and a plurality of finger portions 32 provided to protrude from a periphery of the palm portion 30. The palm portion 30 has a substantially disk shape. Five finger portions 32 are radially provided and integrated with the palm portion 30 so as to surround the palm portion 30. A predetermined interval is formed between the finger portions 32. Inner surfaces of the finger portions 32 are integrated with the palm portion 30. Each of the finger portions 32 may have any outer shape, for example, a cylindrical shape, a conical shape, a truncated conical shape, a triangular prism shape, a square prism shape, a triangular pyramid shape, a square pyramid shape, a truncated square pyramid shape, a rectangular parallelepiped shape, or the like. In the embodiment, the finger portions 32 have the same shape. The plurality of finger portions 32 need not all have the same shape but may have different shapes. Each of the finger portions 32 has a truncated square pyramid shape, and each of the inner surfaces is formed to be inclined outward from a base end continuous with the palm portion 30 toward a distal end.

Figure 3:
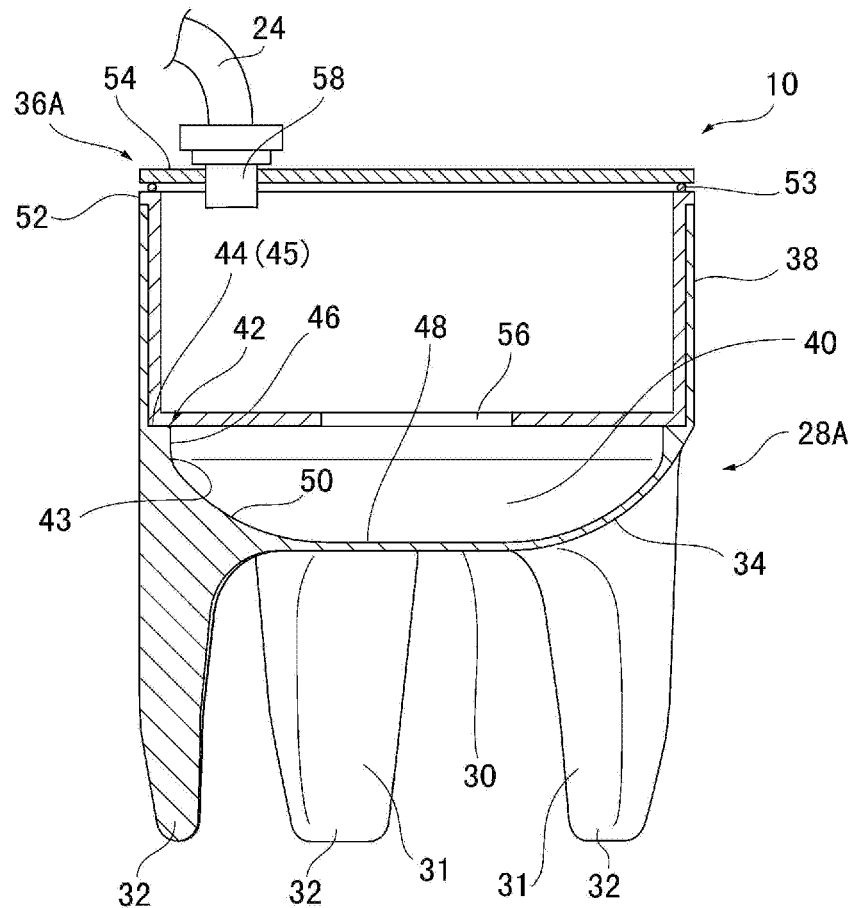
FIG. 3 is a vertical sectional view of the configuration of the gripping device according to the embodiment.

As shown in FIG. 3, the gripper 28A includes integrally a connecting portion 38 in a position surrounding an outer edge of the palm portion 30 on a side opposite to a side formed with the finger portions 32. The connecting portion 38 has a cylindrical shape, and has a circular opening at an upper end in FIG. 3. The finger portions 32 are solid. A material of the finger portions 32 may be the same as or different from a material of other portions (palm portion 30 or connecting portion 38). Further, the material of the finger portions 32 needs not be always uniform but may be a composite of different materials or may contain an additive such as a filler. The opening of the gripper 28A is sealed by the case 36A.

Figure 4:
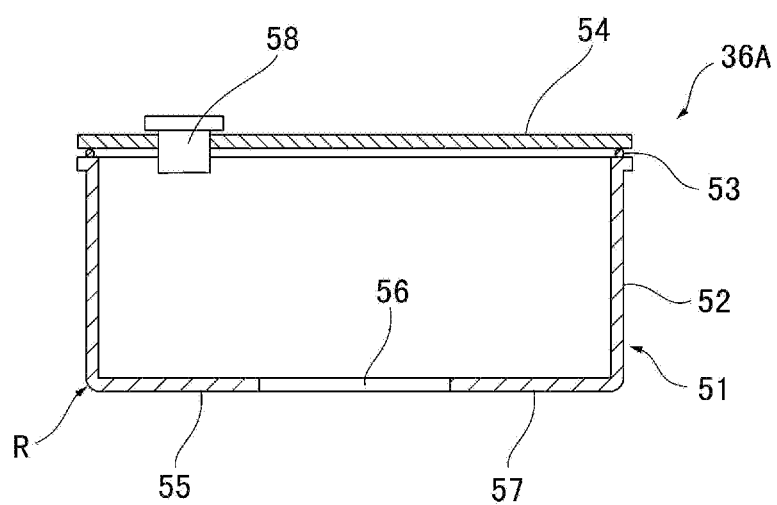
FIG. 4 is a vertical sectional view of a configuration of a case according to the embodiment.

As shown in FIG. 4, the case 36A is preferably made of metal such as stainless, or rigid resin such as plastics, and includes a lower case 51 and an upper case 54. The lower case 51 includes a bottom 57 having a through hole 56 at a center, and a cylindrical portion 52 integrated with an outer edge of the bottom 57. An outer edge R of a bottom surface 55 as a distal end surface of the lower case 51 is chamfered. For chamfering, the outer edge of the bottom surface 55 may be cut into a corner surface or a rounded surface. Smaller chamfering is preferable to prevent local deformation of the connecting portion 38 in the thickness direction.

The upper case 54 is a disk-like member, and has a joint 58 extending therethrough in the thickness direction. An end of the pipe 24 is connected to the joint 58 (FIG. 3). The other end of the pipe 24 is connected to a vacuum pump, for example, via a three-way valve although not shown. The three-way valve includes a vacuum port, a supply and exhaust port, and an atmospheric release port. The vacuum port is connected to the vacuum pump, the supply and exhaust port is connected to the gripping device 10, and the atmospheric release port is connected to an outside. Through the pipe 24, air flows from inside to outside the gripper 28A and from outside to inside the gripper 28A.

The lower case 51 and the upper case 54 are integrated via an O-ring 53 as a sealant at an upper end of the cylindrical portion 52. Between the bottom surface of the lower case 51 and an inner surface of the palm portion 30, a guide space 40 is formed that receives the palm portion 30 deformed in the thickness direction.

The gripper 28A includes, between the connecting portion 38 and the palm portion 30, a high-strength portion 42 that is less likely to be deformed in the thickness direction than the palm portion 30. The high-strength portion 42 is integrated with the palm portion 30 and the connecting portion 38. The high-strength portion 42 includes a base end 44 coming into contact with the lower case 51, and a distal end 43 apart from the base end 44 toward the finger portions 32 and connected to the palm portion 30. The high-strength portion 42 is less likely to be deformed than the palm portion 30, but is not a complete rigid body. The high-strength portion 42 is microscopically deformed at the base end 44 as a fulcrum toward a center of the palm portion 30.

The base end 44 is located apart from the outer edge of the palm portion 30 in the thickness direction of the palm portion 30, that is, in a position apart from the palm portion 30 toward the upper opening of the connecting portion 38. In the embodiment, the base end 44 has a contact surface 45 coming into contact with an outer peripheral portion of the bottom surface 55 of the case 36A. The high-strength portion 42 has an inner peripheral surface 46 in contact with the guide space 40 on a center side of the palm portion 30 continuous with the contact surface 45. The palm portion 30 has, on its inner side, a substantially flat inner surface 48 and a curved surface 50 provided around the inner surface 48 and protruding outward. The inner peripheral surface 46 and the inner surface 48 of the palm portion 30 are connected by the curved surface 50.

The distal end 43 of the high-strength portion 42 is located between the inner peripheral surface 46 and the curved surface 50. The distal end 43 serves as a fulcrum when the palm portion 30 is deformed in the thickness direction.

Figure 5:
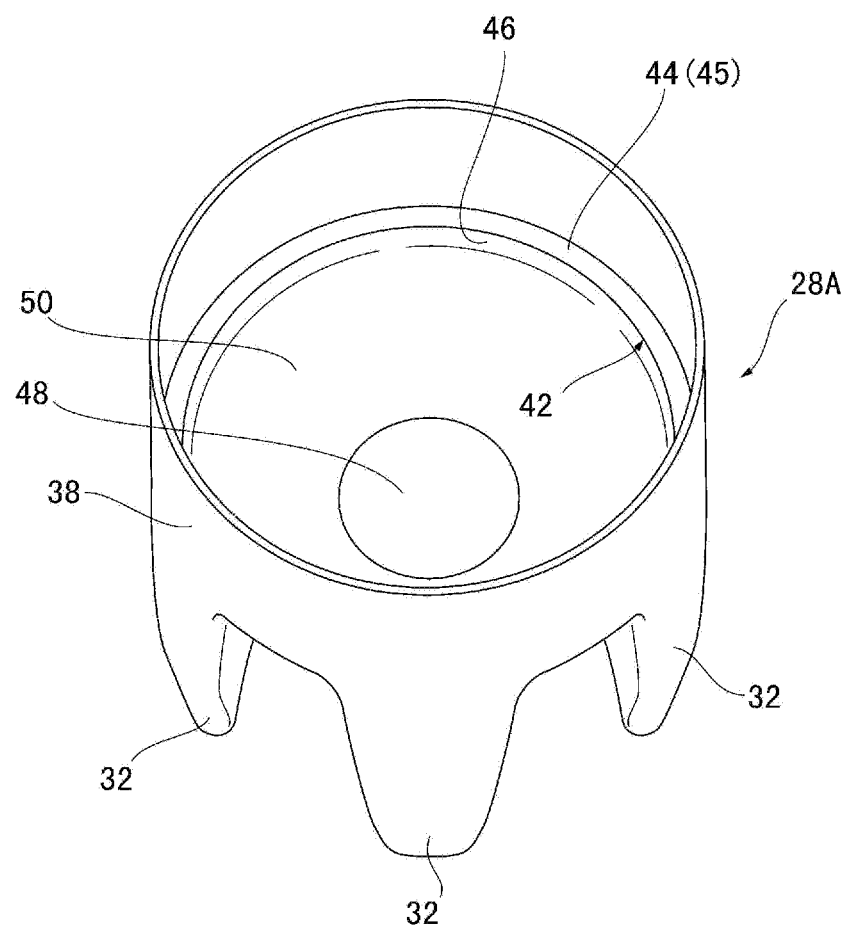
FIG. 5 is a perspective view of a configuration of a gripper according to the embodiment.

As shown in FIG. 5, the high-strength portion 42 is formed to surround the palm portion 30 according to the shape of the connecting portion 38. In FIG. 5, the high-strength portion 42 has an annular shape. The contact surface 45 is an upper surface of the high-strength portion 42. An entire outer peripheral portion of the bottom surface 55 of the case 36A comes into contact with the contact surface 45 of the high-strength portion 42. Although the entire outer peripheral portion is mentioned, a slight part of the outer peripheral portion may not come into contact with the contact surface 45.

(Operation and Effect)

Operation and effect of the industrial robot 12 including the gripping device 10 configured as described above will be described. At a starting point of the industrial robot 12, the piston rod 20 is retracted in the cylinder tube 19, and the air cylinder 18 is contracted. In the gripping device 10, pressure in the gripper 28A is atmospheric pressure in an initial state. Specifically, the three-way valve is in such a state that the vacuum port is blocked and the supply and exhaust port is connected to the atmospheric release port.

In the industrial robot 12, the moving body 16 is moved along the rail 14 to position the gripping device 10 vertically above the workpiece W placed on the base 26 (FIG. 1). Then, in the industrial robot 12, the piston rod 20 is advanced from the cylinder tube 19 to extend the air cylinder 18 until the finger portions 32 reach a side surface of the workpiece W.

Then, the three-way valve is switched to a state where the atmospheric release port is blocked and the supply and exhaust port is connected to the vacuum port. Thus, the gripping device 10 sucks air in the gripper 28A through the pipe 24, and reduces the pressure in the gripper 28A to −0.03 MPa or lower.

Figure 6:
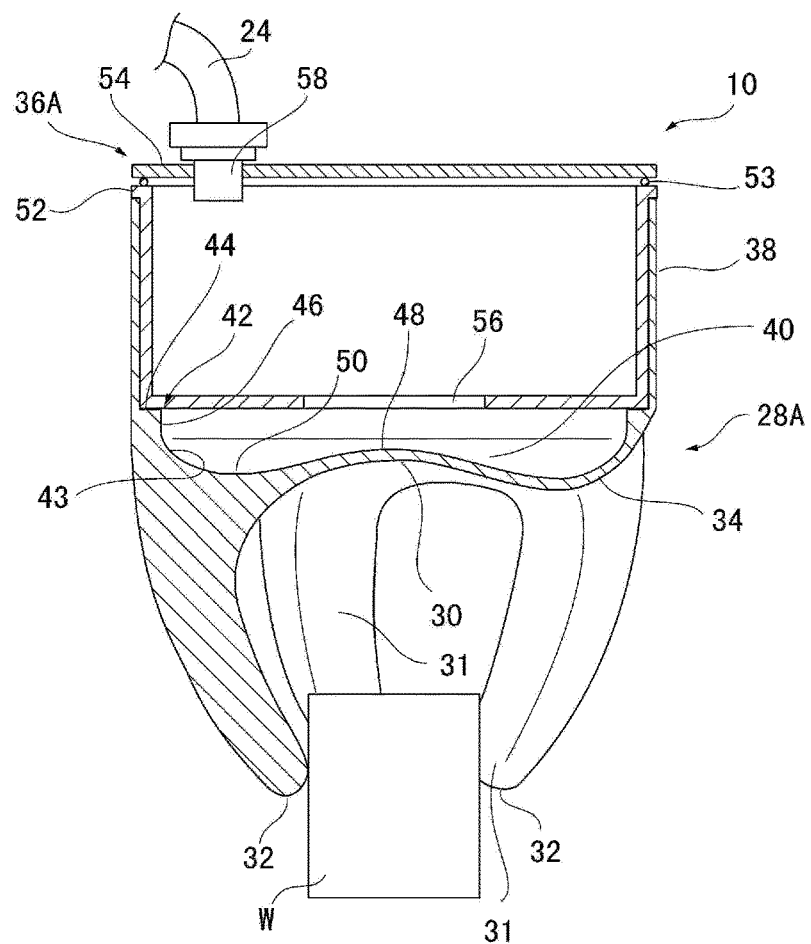
FIG. 6 is a vertical sectional view of a use state of the gripping device according to the embodiment.

The high-strength portion 42 of the gripper 28A keeps holding the shape. Then, the palm portion 30 is deformed in the thickness direction so as to be sucked into the guide space 40 (FIG. 6). As the palm portion 30 is deformed in the thickness direction, the inner surfaces of the finger portions 32 are pulled toward the center of the palm portion 30. Then, the finger portions 32 are elastically deformed to fall toward the palm portion 30. Thus, the finger portions 32, mainly, the inner surfaces 31 come into contact with surfaces of the workpiece W. The high-strength portion 42 is microscopically elastically deformed at the base end 44 as a fulcrum according to the deformation of the palm portion 30.

For the cubic workpiece W in FIG. 6, the finger portions 32 come into contact with the side surfaces of the workpiece W. As described above, the gripping device 10 reduces the pressure in the gripper 28A to grip the workpiece W. The gripping device 10 exerts a gripping force according to the pressure in the gripper 28A. Specifically, the gripping force of the gripping device 10 increases with decreasing pressure in the gripper 28A.

Then, in the industrial robot 12, the piston rod 20 is retracted into the cylinder tube 19 to contract the air cylinder 18, thereby allowing the workpiece W to be lifted from the base 26. Further, in the industrial robot 12, the moving body 16 is moved along the rail 14 or the rail 14 is moved in the Y-axis direction, thereby allowing the workpiece W to be freely moved in a horizontal direction.

After the workpiece W is moved to a desired position, in the industrial robot 12, the piston rod 20 is advanced from the cylinder tube 19 to extend the air cylinder 18 until the workpiece W comes into contact with the base 26. Then, the three-way valve is switched to the state where the vacuum port is blocked and the supply and exhaust port is connected to the atmospheric release port. Then, air flows from the atmospheric release port through the pipe 24 into the gripper 28A. As the pressure in the gripper 28A returns to atmospheric pressure, the palm portion 30 is pressed out of the guide space and returns to its original state. As the palm portion 30 returns to its original state, the finger portions 32 are opened to release the workpiece W.

Then, in the industrial robot 12, the piston rod 20 is retracted into the cylinder tube 19 to contract the air cylinder 18 to separate the gripping device 10 from the workpiece W. In this manner, the industrial robot 12 can grip the workpiece W placed on the base 26 with the gripping device 10 to move the workpiece W to a desired position.

The high-strength portion 42 prevents contraction of an outer periphery of the palm portion 30, and thus the palm portion 30 is deformed in the thickness direction to deform the finger portions 32 toward the palm portion 30. Thus, the gripping device 10 can more reliably grip the workpiece W without using a granular material. Since the gripping device 10 does not use a granular material, the workpiece W is not contaminated even if the gripper 28A bursts.

The gripper 28A does not use a granular material, and thus can grip the workpiece W even if the distal ends of the finger portions 32 are directed downward, sideways, or upward. Thus, the gripping device 10 can lift the workpiece W on the base 26 and also can grip the workpiece W suspended from a vertical wall surface or a ceiling. The finger portions 32 have higher rigidity than a granular material after jamming transition, thereby allowing the workpiece W to be more reliably gripped.

The gripping device 10 reduces the pressure in the gripper 28A to reliably deform the palm portion 30 in the thickness direction, thereby gripping the workpiece W. Thus, there is no need to press the gripper 28A against the workpiece W.

Thus, the gripping device 10 can grip a soft workpiece W such as food without crushing the workpiece W, thereby preventing damage to the workpiece W.

The gripper 28A can change an amount of deformation of the finger portions 32 and a gripping force according to a degree of reduction in pressure in the gripper 28A. Thus, the gripping device 10 can change the gripping force according to a size or hardness of the workpiece W, thereby improving versatility. The palm portion 30 is deformed in the thickness direction so as to be sucked into the guide space 40, and thus the finger portions 32 are deformed at a sharper angle toward the palm portion 30. This allows the gripping device 10 to grip a smaller workpiece W.

The high-strength portion 42 is integrated with the palm portion 30 and the finger portions 32, and is microscopically deformed according to the deformation of the palm portion 30 in the thickness direction. Thus, the finger portions 32 are continuously and gently deformed according to the deformation of the palm portion 30. Thus, the gripping device 10 can softly grip the workpiece W. In a gripper 28A without a high-strength portion 42, finger portions 32 are deformed to be buckled.

The gripper 28A includes integrally the palm portion 30, the finger portions 32, the high-strength portion 42, and the connecting portion 38, thereby reducing the number of components and the number of manufacturing steps. The palm portion 30, to which a heavy load is applied when the pressure is reduced, and the high-strength portion 42 are integrated, thereby preventing damage to the gripper 28A and improving durability.

Modified Example

The present invention is not limited to the above embodiment, but may be changed as appropriate within the scope of the present invention.

Figure 7:
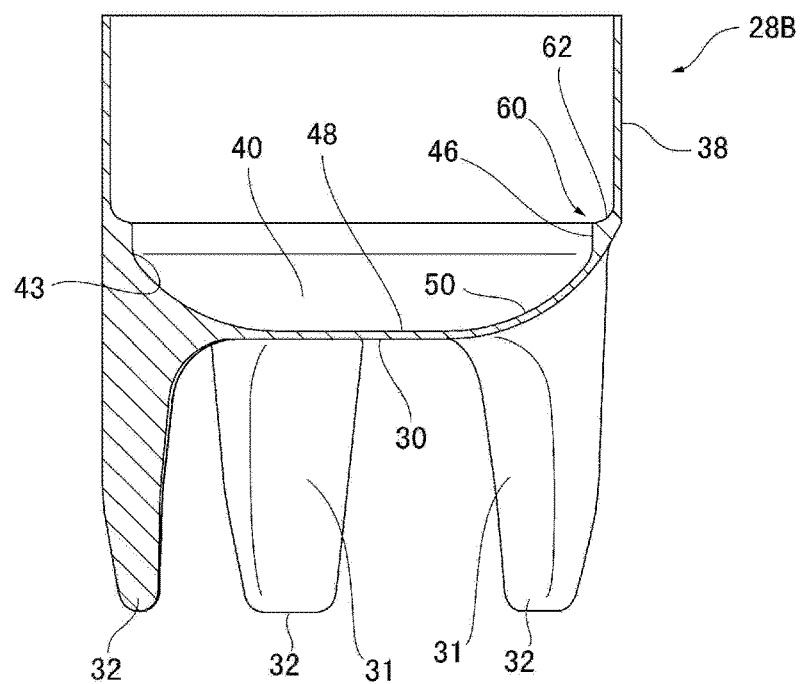
FIG. 7 is a vertical sectional view of a configuration of a gripper according to Modified example (1)

For example, a gripper 28B in FIG. 7 is different from the gripper of the embodiment in that a curved surface protruding outward is provided between a contact surface 62 of a high-strength portion 60 and an inner surface of the connecting portion 38. Providing the curved surface protruding outward between the contact surface 62 and the inner surface of the connecting portion 38 increases mechanical strength of the connecting portion 38 in a position corresponding to the distal end of the case 36A, thereby preventing local deformation of the connecting portion 38 in the thickness direction. Preventing the local deformation of the connecting portion 38 allows uniform deformation of the finger portions 32, and thus the gripper 28B can more reliably grip the workpiece W. The local deformation of the connecting portion 38 in the position corresponding to the distal end of the case 36A causes deviation of the gripper from the case 36A when the pressure is reduced, which makes it difficult for the finger portions 32 to be uniformly deformed.

Figure 8:
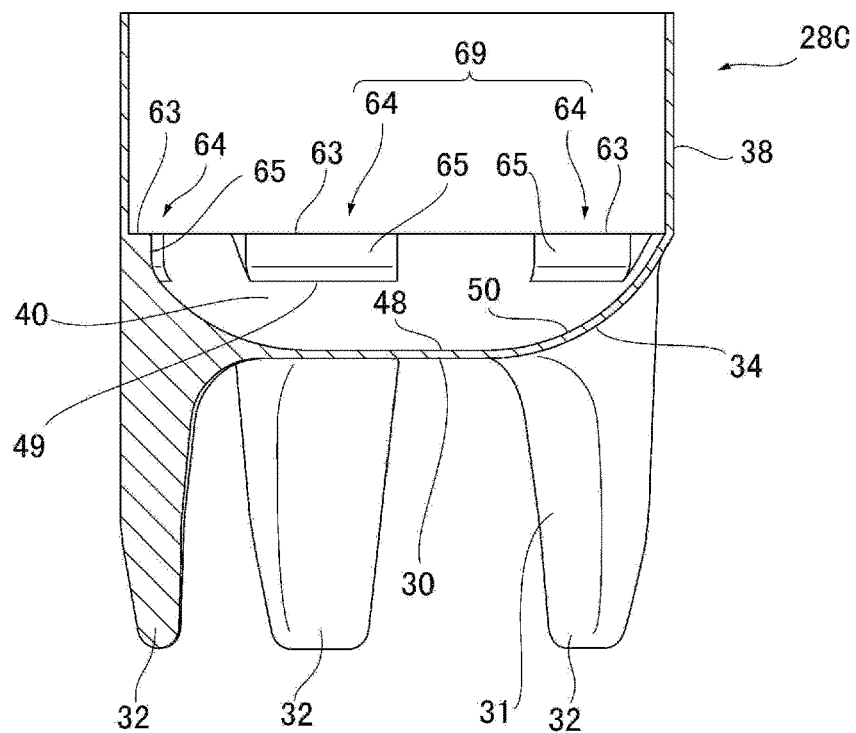
FIG. 8 is a vertical sectional view of a configuration of a gripper according to Modified example (2)
Figure 9:
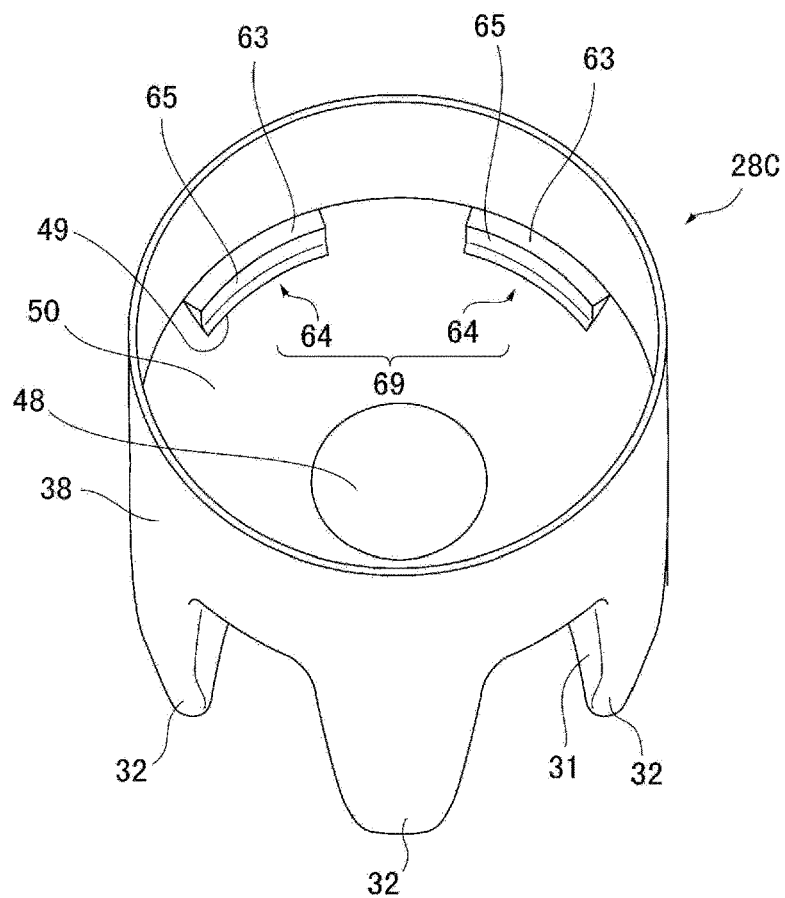
FIG. 9 is a perspective view of the configuration of the gripper according to Modified example (2)

A high-strength portion 69 of a gripper 28C in FIGS. 8 and 9 includes a plurality of strips 64 provided in positions corresponding to the finger portions 32. In FIGS. 8 and 9, the number of the strips 64 is five like the finger portions 32. The strips 64 are arranged at regular intervals at base ends of the finger portions 32 around the palm portion 30. Each of the strips 64 has a contact surface 63 as an upper surface and an inner peripheral surface 65 as an inner surface on a side of the palm portion 30. A distal end 49 of the high-strength portion 69 is located between the inner peripheral surface 65 and the curved surface 50. The distal end 49 serves as a fulcrum when the palm portion 30 is deformed in the thickness direction. The outer peripheral portion of the bottom surface 55 of the case 36A partially comes into contact with the contact surface 63 of the high-strength portion 69. The gripper 28C in FIGS. 8 and 9 includes the high-strength portion 69, and thus may have the same advantage as in the embodiment. The high-strength portion 69 in this modified example can reduce an amount of material between the strips 64 as compared to an annular high-strength portion, thereby reducing weight.

Figure 10A:
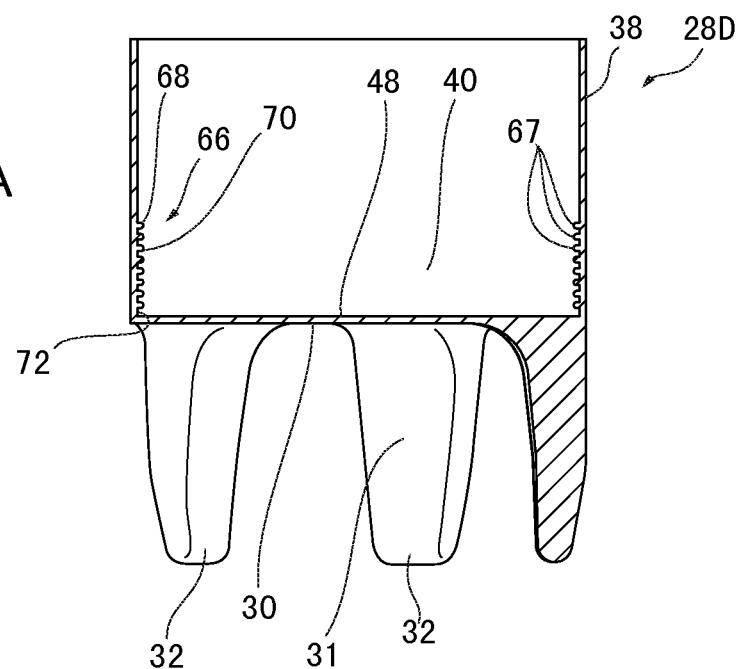
FIG. 10A is a partial end view.
Figure 10B:
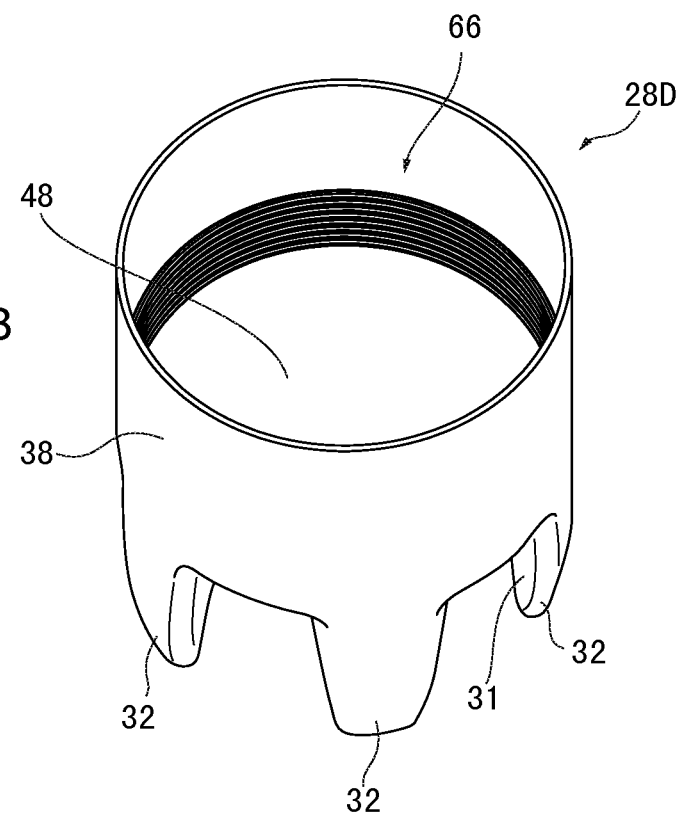
FIG. 10B is a perspective view.

A high-strength portion 66 of a gripper 28D in FIGS. 10A and 10B includes a plurality of annular protrusions 67. The annular protrusions 67 are arranged at predetermined intervals in parallel with the thickness direction of the palm portion 30. An upper surface of one of the protrusions 67 located farthest from the palm portion 30 is a contact surface 68. An inner surface of each of the protrusions 67 on the side of the palm portion 30 is an inner peripheral surface 70. A flat surface is formed between the inner peripheral surface 70 and the inner surface 48 of the palm portion 30. The entire outer peripheral portion of the bottom surface 55 of the case 36A comes into contact with the contact surface 68 of the high-strength portion 66. The gripper 28D in FIGS. 10A and 10B includes the high-strength portion 66, and thus may have the same advantage as in the embodiment.

Figure 11A:
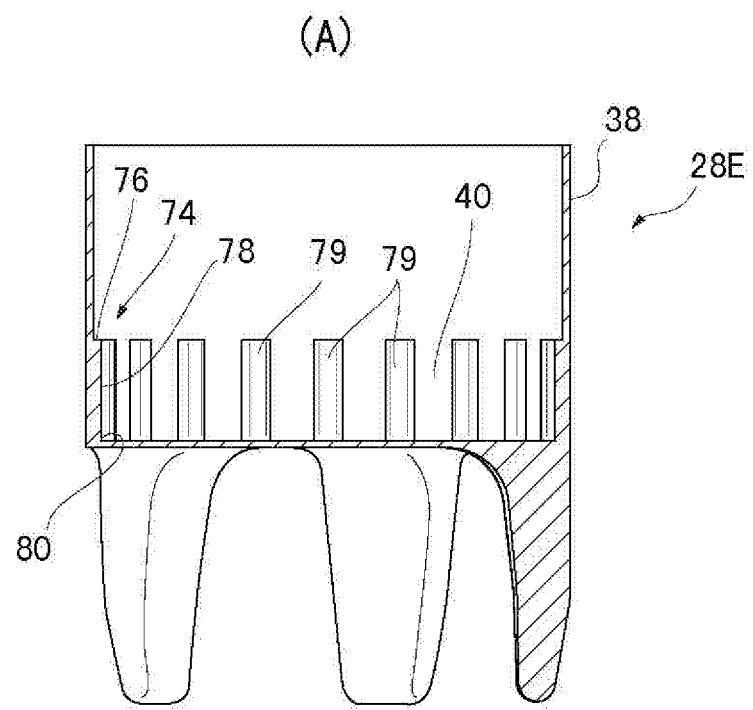
FIG. 11A is a vertical sectional view.
Figure 11B:
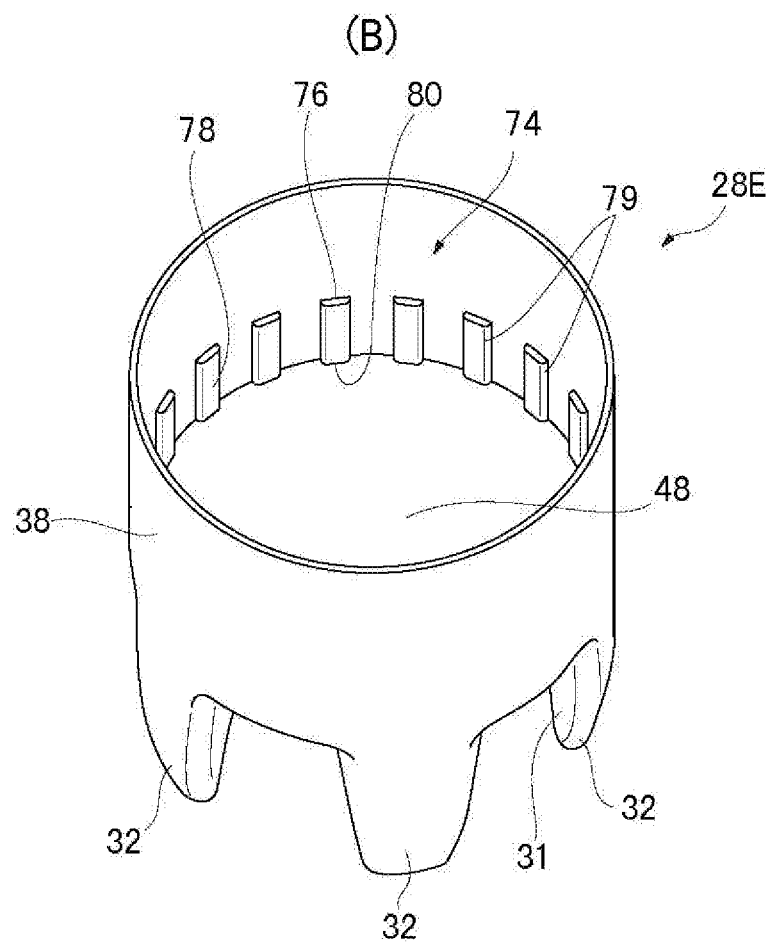
FIG. 11B is a perspective view.

A high-strength portion 74 of a gripper 28E in FIGS. 11A and 11B includes a plurality of ribs 79 whose longitudinal direction is the thickness direction of the palm portion 30. The ribs 79 are arranged at predetermined intervals around the palm portion 30. An upper surface of each of the ribs 79 is a contact surface 76, and an inner surface of each of the ribs 79 on the side of the palm portion 30 is an inner peripheral surface 78. A flat surface is formed between the inner peripheral surface 78 and the inner surface 48 of the palm portion 30. The outer peripheral portion of the bottom surface 55 of the case 36A partially comes into contact with the contact surface 76 of the high-strength portion 74. The gripper 28E in FIGS. 11A and 11B includes the high-strength portion 74, and thus may have the same advantage as in the embodiment.

Figure 12:
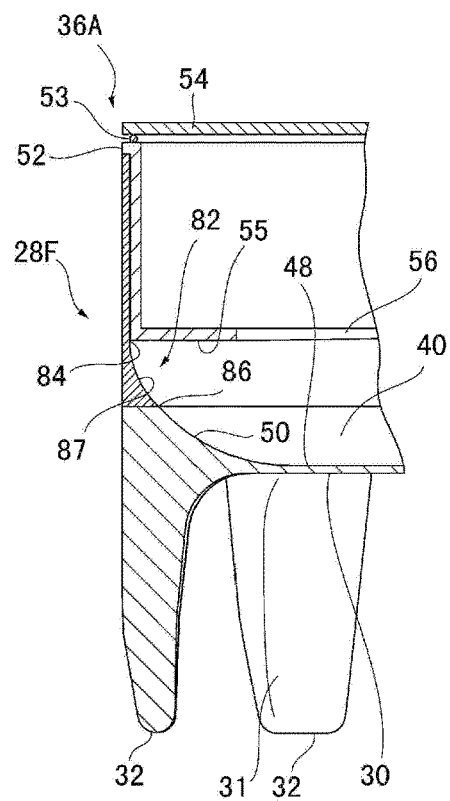
FIG. 12 is a partial vertical sectional view of a gripper according to Modified example (5)
Figure 13:
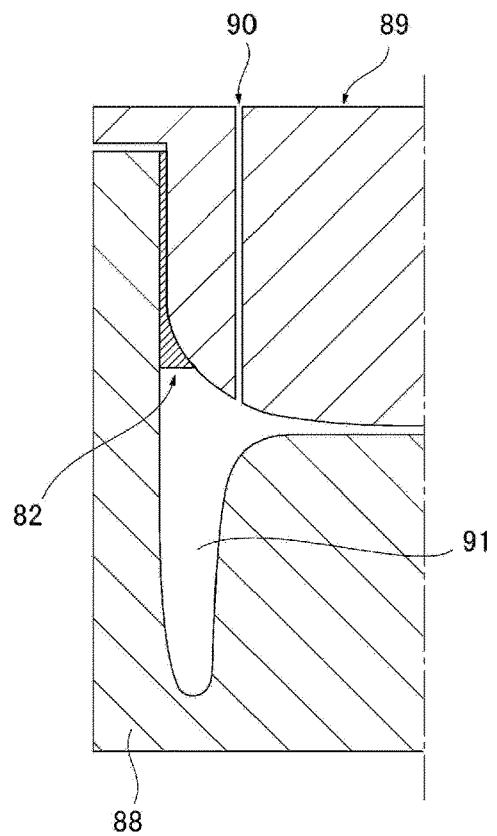
FIG. 13 is a partial vertical sectional view illustrating a method for manufacturing the gripper according to Modified example (5)

A high-strength portion 82 of a gripper 28F in FIG. 12 is made of a material having higher mechanical strength than a material of the palm portion 30. In FIG. 12, a base end of the high-strength portion 82 is a portion 84 coming into contact with the distal end of the case 36A. A distal end 86 of the high-strength portion 82 as an interface with the palm portion 30 serves as a fulcrum when the palm portion 30 is deformed in the thickness direction. An inner peripheral surface 87 of the high-strength portion 82 on the side of the palm portion 30 is gently continuous with the curved surface 50. The gripper 28F in FIG. 12 can be manufactured by insert molding as shown in FIG. 13. To manufacture the gripper 28F, a mold is used constituted by a lower mold 88 having a recess 91 in the shape of each finger portion 32, and an upper mold 89 having a protrusion in the shape of the guide space 40. The high-strength portion 82, which is previously made of a predetermined material, for example, a resin material having higher hardness than a material for making the palm portion 30 and the finger portions 32, is placed in a predetermined position, and the upper mold 89 is fitted to the lower mold 88. Through an injection hole 90 provided in the upper mold 89, a resin material for making the palm portion 30 and the finger portions 32 is charged into a space surrounded by the lower mold 88 and the upper mold 89. When the resin hardens, the mold is removed to obtain the gripper 28F including integrally the high-strength portion 82, the finger portions 32, and the palm portion 30. The gripper 28F in FIG. 12 includes the high-strength portion 82, and thus may have the same advantage as in the embodiment.

Figure 14:
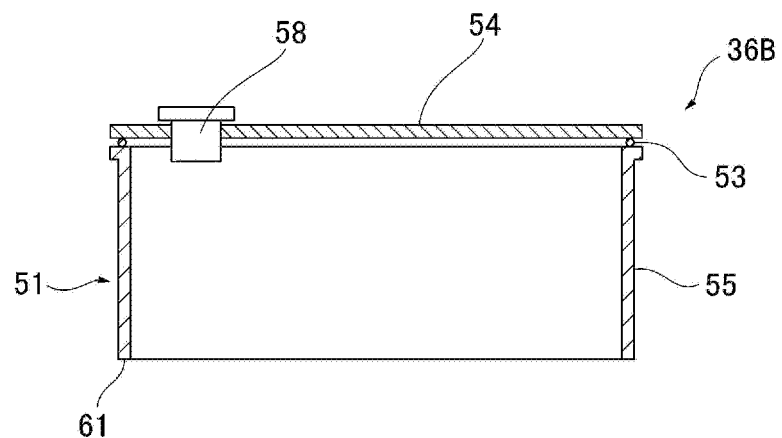
FIG. 14 is a vertical sectional view of a configuration of a case according to a modified example.

In the embodiment, the lower case 51 having the bottom 57 has been described, but the present invention is not limited to this. For example, in a case 36B in FIG. 14, a lower case 51 has a cylindrical shape without a bottom. A lower end 61 as a distal end of the lower case 51 comes into contact with the base end of the high-strength portion 42.

Figure 15:
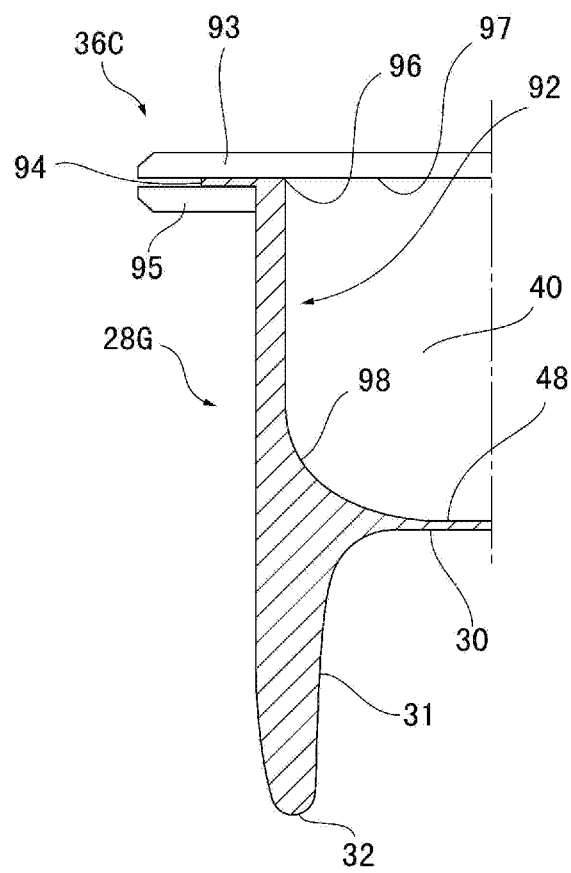
FIG. 15 is a partial vertical sectional view of a configuration of a gripping device according to a modified example.

A case 36C in FIG. 15 includes a disk-like upper case 93 and an annular lower case 95. A gripper 28G includes a flange-like connecting portion 94 integrated with a peripheral edge of an opening. The connecting portion 94 is held and fixed between the upper case 93 and the lower case 95 to seal the opening of the gripper 28G. A high-strength portion 92 of the gripper 28G is thicker than the palm portion 30, and is less likely to be deformed in the thickness direction than the palm portion 30. A base end 96 of the high-strength portion 92 comes into contact with a lower surface of the upper case 93. The gripper 28G in FIG. 15 includes the high-strength portion 92, and thus may have the same advantage as in the embodiment.

In the embodiment, the palm portion 30 having the substantially disk shape, the connecting portion 38 having the cylindrical shape, and the upper opening of the gripper 28A having the circular shape have been described, but the present invention is not limited to them. The palm portion 30, the connecting portion 38, and the upper opening may each have an elliptical shape, an oval shape, or a rectangular shape in a plan view. For example, when these portions each have a rectangular shape, two sets of finger portions 32 (each set including, for example, two finger portions) along long sides of the palm portion 30 may be provided on opposite sides of the palm portion 30. A gripping device including such a gripper can easily grip a long member such as of a cylindrical shape or a prism shape.

In the embodiment, the orthogonal robot is exemplified as the industrial robot 12. However, the present invention is not limited to this, but may be applied to a SCARA robot, an articulated robot, or the like. Specifically, the gripping device 10 can grip the workpiece W and keep the gripping state even if rotated around X, Y, and Z axes by the industrial robot 12.

The gripper 28A may be made of one material or may be formed of a stack of films of a plurality of different materials. The gripper 28A may be partially made of a different material. The gripper 28A needs not have a fixed thickness, but may partially have a thick or thin portion.

The gripping device 10 may have a claw portion on the finger portion 32. The claw portion may be made of a plate-like member, a conical member, or a sack-like member of synthetic resin.

The gripping device 10 may include a camera for taking an image of the workpiece W, a gravimeter for measuring a weight of the gripped workpiece W, a proximity sensor for measuring a distance between the workpiece W and the gripper 28A, or the like.

An appearance configuration of the gripper 28A is not limited to one shown in FIG. 2. For example, a length of each finger portion 32 and the number of finger portions 32 may be selected as appropriate.

REFERENCE SIGNS LIST 10 gripping device
12 industrial robot
28A to 28G gripper
30 palm portion
32 finger portion
36A to 36C case
42, 60, 66, 69, 74, 82, 92 high-strength portion
43 distal end
44 base end
45, 62, 63, 68, 76 contact surface

The invention claimed is:

1. A gripper comprising integrally:
a palm portion;
a plurality of finger portions protruding from a periphery of the palm portion and configured to fall toward the palm portion by deforming the palm portion in a thickness direction;
a connecting portion formed in a position surrounding an outer edge of the palm portion on a side opposite to a side formed with the finger portions, the connecting portion connected to a case; and
a high-strength portion provided between the palm portion and the connecting portion, the high-strength portion having a predetermined length from the outer edge of the palm portion in the thickness direction of the palm portion, and the high-strength portion being less likely to be deformed than the palm portion, wherein
a base end of the high-strength portion comes into contact with a part of the case, and
the high-strength portion is configured to be microscopically elastically deformed toward the palm portion with the base end as a fulcrum according to a deformation of the palm portion.

2. The gripper according to claim 1, wherein the base end of the high-strength portion has a contact surface coming into contact with the case.

3. The gripper according to claim 1, wherein the high-strength portion is thicker than the palm portion.

4. The gripper according to claim 1, wherein the high-strength portion is made of a material having higher mechanical strength than a material of the palm portion.

5. A gripping device comprising:
the gripper according to claim 1; and
the case connected to the connecting portion.

6. An industrial robot comprising the gripping device according to claim 5.

7. The gripper according to claim 1, wherein a guide space is formed between the palm portion and the case, the palm portion is configured to be deformed in the thickness direction so as to be sucked into the guide space by sucking air inside the gripper.

8. The gripper according to claim 1, wherein the base end of the high-strength portion has a contact surface coming into contact with an outer peripheral portion of a bottom surface of the case.

* * * * *